United States Patent
Civlin

(10) Patent No.: US 7,269,830 B2
(45) Date of Patent: Sep. 11, 2007

(54) METHODS AND HARDWARE FOR SAFE MEMORY ALLOCATION IN ARBITRARY PROGRAM ENVIRONMENTS

(75) Inventor: Jan Civlin, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 854 days.

(21) Appl. No.: 10/667,274

(22) Filed: Sep. 16, 2003

(65) Prior Publication Data

US 2005/0060694 A1 Mar. 17, 2005

(51) Int. Cl.
G06F 9/445 (2006.01)

(52) U.S. Cl. ............................ 717/170; 718/108

(58) Field of Classification Search ............... 717/151, 717/128, 161, 100, 170, 136, 140, 146, 153, 717/154, 155, 162; 718/103, 108, 1, 100, 718/102, 104; 711/128, 1, 3, 147; 714/47; 712/208, 209; 713/1; 703/13, 20; 707/206, 707/203; 700/79

See application file for complete search history.

(56) References Cited

U.S. PATENT DOCUMENTS

| | | | | |
|---|---|---|---|---|
| 5,537,541 A * | 7/1996 | Wibecan | ........................ | 714/45 |
| 5,727,167 A * | 3/1998 | Dwyer et al. | ................ | 710/100 |
| 5,799,143 A * | 8/1998 | Butt et al. | ..................... | 714/38 |
| 5,970,439 A * | 10/1999 | Levine et al. | ................ | 702/186 |
| 6,018,759 A * | 1/2000 | Doing et al. | ................. | 718/108 |
| 6,105,051 A * | 8/2000 | Borkenhagen et al. | ...... | 718/103 |
| 6,112,317 A * | 8/2000 | Berc et al. | ..................... | 714/47 |
| 6,148,437 A * | 11/2000 | Shah et al. | .................... | 717/128 |
| 6,158,049 A * | 12/2000 | Goodwin et al. | ........... | 717/158 |
| 6,189,141 B1 * | 2/2001 | Benitez et al. | .............. | 717/153 |
| 6,202,205 B1 * | 3/2001 | Saboff et al. | ............... | 717/151 |
| 6,349,394 B1 * | 2/2002 | Brock et al. | ................... | 714/47 |
| 6,446,029 B1 * | 9/2002 | Davidson et al. | ........... | 702/186 |
| 6,567,839 B1 * | 5/2003 | Borkenhagen et al. | ...... | 718/103 |
| 6,601,149 B1 * | 7/2003 | Brock et al. | ................. | 711/154 |
| 6,684,298 B1 * | 1/2004 | Dwarkadas et al. | ......... | 711/128 |
| 6,898,718 B2 * | 5/2005 | Morrow | ....................... | 713/320 |
| 6,966,055 B2 * | 11/2005 | Haber et al. | ................. | 717/151 |

(Continued)

OTHER PUBLICATIONS

Dynamic Trace Selection Using Performance Monitoring Hardware Sampling, IEEE Howard Chen et al, Mar. 2003, pp. 79-90.*

*Primary Examiner*—Todd Ingberg
(74) *Attorney, Agent, or Firm*—Martine Penilla & Gencarella, LLP

(57) ABSTRACT

In a method for dynamic allocation of memory address space, an original version of a program is executed. This execution includes the execution of a request to use memory address space occupied by an optimized version of the program that is protected from modification. When this request is detected, execution control is passed to an optimization code that was used to define the optimized program. The optimization code copies a portion of the optimized program residing in the memory address space requested by the original program, writes the copied portion to unallocated memory address space, and adjusts the code of the optimized program. The protection of the copied portion of the optimized program is released, and execution control is returned to the original program. The request to use the memory address space occupied by the portion of the optimized for which the protection has been released is then re-executed.

42 Claims, 5 Drawing Sheets

U.S. PATENT DOCUMENTS

| | | | |
|---|---|---|---|
| 6,986,142 B1 * | 1/2006 | Ehlig et al. | 718/108 |
| 6,993,556 B1 * | 1/2006 | Seliger et al. | 709/203 |
| 7,000,227 B1 * | 2/2006 | Henry | 717/152 |
| 7,062,756 B2 * | 6/2006 | Kamen et al. | 717/127 |
| 7,086,039 B2 * | 8/2006 | Lam | 717/136 |
| 7,117,501 B2 * | 10/2006 | Rosu et al. | 719/310 |
| 7,146,607 B2 * | 12/2006 | Nair et al. | 717/151 |
| 2003/0065959 A1 * | 4/2003 | Morrow | 713/300 |

* cited by examiner

METHODS AND HARDWARE FOR SAFE MEMORY ALLOCATION IN ARBITRARY PROGRAM ENVIRONMENTS

CROSS REFERENCE TO RELATED APPLICATIONS

This application is related to the following applications: 1) U.S. application Ser. No. 10/633,108, filed on Aug. 1, 2003, and entitled "Method for Dynamic Recompilation of a Program;" and 2) U.S. application Ser. No. 10/650,190, filed on Aug. 27, 2003, and entitled "Methods for Execution Control Acquisition of a Program and for Executing an Optimized Version of a Program." The disclosures of these related applications are incorporated herein by reference.

BACKGROUND OF THE INVENTION

The present invention relates generally to computer systems and, more particularly, to methods and hardware for protecting dynamically allocated memory address space from inadvertent overwrite or other modification.

In the dynamic recompilation of programs, new code allocation in the address space of the program that is the subject of the dynamic recompilation raises a potential problem. If the original program obeys the system application binary interface (ABI), then the allocation of new code via system request cannot collide with the addresses allocated for the original program. On the other hand, if the original program is arbitrary and does not obey the system ABI, then the allocation of new code via system request may collide with the addresses allocated for the original program. Accordingly, there may be situations where the system or other code will inadvertently overwrite data for optimized code written to certain memory address spaces. When this happens, the optimized code will fail during execution, and the cause of its failure may not necessarily be evident upon first examination. Consequently, such failures can introduce unexpected increases in development costs to research and diagnose the cause of the failure.

In view of the foregoing, there is a need for a method for the safe allocation of memory address space in arbitrary program environments that reliably avoids collisions with addresses allocated for the original program.

SUMMARY OF THE INVENTION

Broadly speaking, the present invention fills this need by providing, among other things, a method for dynamic allocation of memory address space that prevents optimized code from being overwritten by other code. Computer readable media containing program instructions for dynamic allocation of memory address space and a hardware component having logic for the dynamic allocation of memory address space also are provided.

In accordance with one aspect of the present invention, a method for dynamic allocation of memory address space is provided. In this method, an original version of a program is executed. The execution of the original version of the program includes the execution of a request to use memory address space occupied by an optimized version of the program that is protected from modification. The request to use the memory address space occupied by the optimized version of the program is detected during the execution of the original version of the program, and execution control is passed to an optimization code that was used to define the optimized version of the program. The optimization code copies a portion of the optimized version of the program residing in the memory address space requested by the original version of the program, writes the copied portion of the optimized version of the program to unallocated memory address space, and adjusts the code of the optimized version of the program. The protection from modification of the copied portion of the optimized version of the program is released after completing the writing, and execution control is returned to the original version of the program. The request to use the memory address space occupied by the portion of the optimized version of the program for which the protection has been released is then re-executed.

In one embodiment, the optimized version of the program is defined by pages of code. In one embodiment, the portion of the optimized version of the program that is copied and written to unallocated memory address space is defined by one or more pages of code. In one embodiment, the memory address space to which the copied portion of the optimized version of the program is written is protected from modification. In one embodiment, the memory address space that is protected from modification is defined by one or more protected pages of code.

In one embodiment, the adjustment of the code of the optimized version of the program is configured to enable interoperability of the code of the optimized version of the program. In one embodiment, the adjustment of the code of the optimized version of the program includes adjusting address data associated with at least one of pointers, branch instructions, and jump instructions. In one embodiment, the protection from modification of the optimized version of the program places the optimized version of the program in a read-only state. In one embodiment, the protection from modification of the optimized version of the program is released by removing the read-only state. In one embodiment, the protection from modification is carried out by a hardware device.

In accordance with another aspect of the present invention, computer readable media containing program instructions for dynamic allocation of memory address space are provided. In one embodiment, the computer readable media includes program instructions for protecting an optimized version of a program from modification and program instructions for executing an original version of the program. The executing of the original version of the program includes executing a request to use memory address space occupied by the optimized version of the program. The computer readable media also includes program instructions for copying a portion of the optimized version of the program residing in the memory address space requested by the original version of the program, writing the copied portion of the optimized version of the program to unallocated memory address space, and adjusting code of the optimized version of the program. The computer readable media further includes program instructions for releasing the protecting of the copied portion of the optimized version of the program from modification after completing the writing, program instructions for returning execution control to the original version of the program, and program instructions for re-executing the request to use the memory address space occupied by the portion of the optimized version of the program for which the protecting has been released.

In one embodiment, the computer readable media further includes program instructions for detecting the request to use the memory address space occupied by the optimized version of the program during execution of the original version of the program, and program instructions for passing execution control to an optimization code that was used to define the optimized version of the program, the optimization code being configured to execute the copying and the releasing.

In accordance with yet another aspect of the present invention, a hardware component including logic for the dynamic allocation of memory address space is provided. The hardware component includes logic for executing an original version of a program. The execution of the original version of the program includes the executing of a request to use memory address space occupied by an optimized version of the program, with the optimized version of the program being protected from modification. The hardware component also includes logic for detecting the request to use the memory address space occupied by the optimized version of the program during execution of the original version of the program and logic for passing execution control to an optimization code that was used to define the optimized version of the program. The optimization code executes copying of a portion of the optimized version of the program residing in the memory address space requested by the original version of the program, writing of the copied portion of the optimized version of the program to unallocated memory address space, adjusting of the code of the optimized version of the program, and releasing of the protecting of the copied portion of the optimized version of the program from modification after completing the writing. The hardware component further includes logic for returning execution control to the original version of the program, and logic for re-executing the request to use the memory address space occupied by the portion of the optimized version of the program for which the protecting has been released. In one embodiment, the hardware component is a processor.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF EXEMPLARY EMBODIMENTS

Several exemplary embodiments of the invention will now be described in detail with reference to the accompanying drawings.

Original binary code sometimes needs to be updated when improvements to hardware require the code to handle new processing conditions. As described in more detail below, optimization of the original binary code can be done using a dynamic optimizer, which takes the original binary code and then generates optimized binary code that is better suited to handle the new processing conditions. Ideally, once the optimized binary code is generated, all future processing of the code will be done exclusively using the optimized binary code. However, because the optimized code is generated dynamically by the optimization code, the operating system will not be aware of which address memory space was allocated for the optimized code. Consequently, if an exception occurs during execution of the optimized code, control will be returned to the operating system. Thereafter, the operating system will resume execution on the original binary code (i.e., not the optimized code) because the operating system is not aware of the optimized binary code. During execution of the original binary code, the system or the original binary code will request write access to new unallocated address memory space. However, because both the operating system and the original code are unaware of the optimized binary code, the operating system or the original code may select address space that is currently occupied by the optimized code, particularly in arbitrary program environments. When this happens, at least a portion of the optimized code will be overwritten, thus destroying the operational benefit of having optimized code. In the description that follows, reference will be made to FIG. 1 to provide an overview of exemplary interaction between original binary code and optimized code, and to FIGS. 2-5 to illustrate protection methods in accordance with embodiments of the invention.

Figure 1:
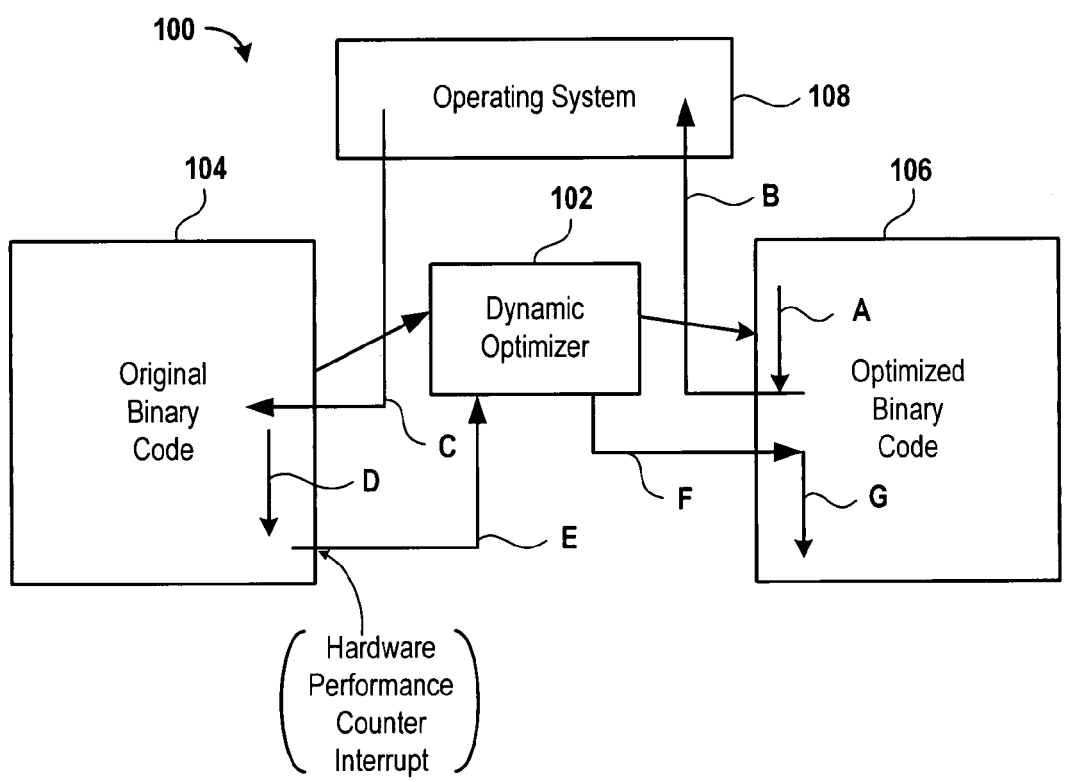
FIG. 1 is a schematic diagram that illustrates an exemplary execution of an optimized version of a program.

FIG. 1 is a schematic diagram 100 that illustrates an exemplary execution of an optimized version of a program. Referring to FIG. 1, dynamic optimizer (DO) 102 carries out the execution using original binary code 104 for a program and optimized binary code 106 for the program, as will be described in more detail below. The creation of optimized binary code 106 by an exemplary dynamic optimizer and additional details regarding the functionality of the dynamic optimizer are set forth in commonly owned U.S. application Ser. No. 10/633,108, filed on Aug. 1, 2003, and entitled "Method for Dynamic Recompilation of a Program," the disclosure of which is incorporated herein by reference.

As shown in FIG. 1, DO 102 has passed execution control to optimized binary code 106 and the optimized binary code is executed along the process flow indicated by arrow A. During execution of optimized binary code 106, an exception occurs and this exception triggers an interrupt that passes execution control to operating system 108 (as indicated by arrow B). In some instances, operating system 108 may not be aware that it took control from optimized binary code 106. Thus, when operating system 108 redirects execution of the program, the operating system may return execution control to original binary code 104 (as indicated by arrow C). As original binary code 104 is executed along the process flow indicated by arrow D, a hardware performance counter will trigger a hardware interrupt, as is explained in more detail in commonly owned U.S. application Ser. No. 10/650,190, filed on Aug. 27, 2003, and entitled "Methods for Execution Control Acquisition of a Program and for Executing an Optimized Version of a Program," the disclosure of which is incorporated herein by reference. When this interrupt occurs, execution control switches to DO 102 (as indicated by arrow E) and DO 102 returns execution control to optimized binary code 106 (as indicated by arrow F) for continued execution of the program. Thereafter, execution of optimized binary code 106 continues along the process flow indicated by arrow G. When another exception that passes execution control to operating system 108 occurs, the above-described cycle of events will repeat itself.

Figure 2:
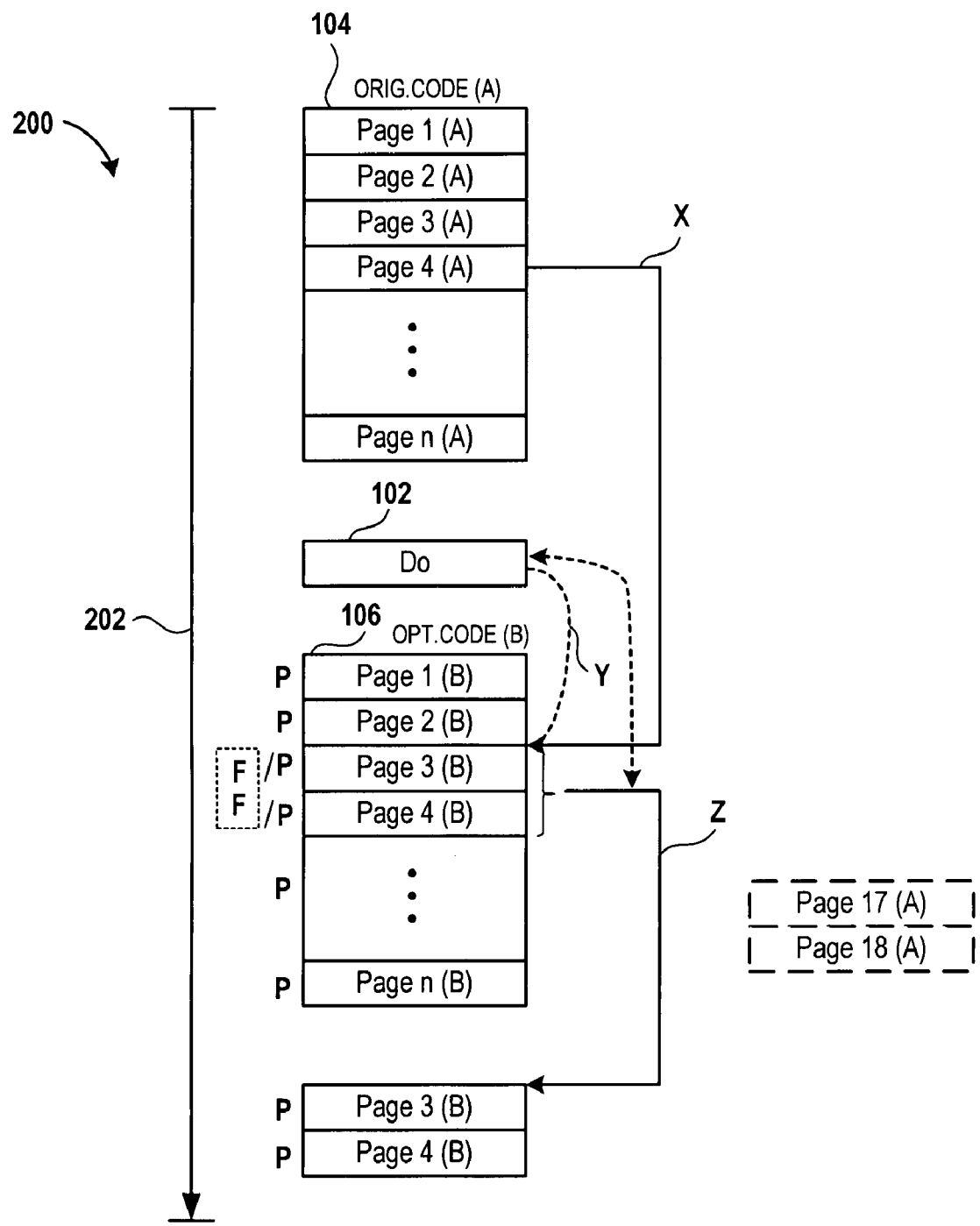
FIG. 2 is a schematic diagram that illustrates the dynamic allocation of memory address space during an exemplary execution of an optimized version of a program in accordance with one embodiment of the present invention.

FIG. 2 is a schematic diagram 200 that illustrates the dynamic allocation of memory address space during an exemplary execution of an optimized version of a program in accordance with one embodiment of the present invention. As shown in FIG. 2, memory address space 202 includes original binary code 104 and optimized binary code 106. As is well known to those skilled in the art, original binary code 104 and optimized binary code may be defined by pages of code. As a simplified example, page 1(A), page 2(A), . . . page n(A) may indicate pages of original binary code 104 and page 1(B), page 2(B), . . . page n(B) may indicate pages of optimized binary code 106. When optimized binary code 106 is executed, the optimized binary code is protected from modification before control is returned to the operating system, e.g., to execute original code 104. As shown in FIG. 2, the symbol P indicates that the pages of the optimized binary code 106 are protected. The protection of the optimized binary code 106 may be implemented using either software or hardware depending upon the particular operating system and hardware configuration being used. In one embodiment, the protection of optimized binary code is 106 implemented by placing the pages of the optimized binary code in a read-only state. Other protection schemes also may be used to mark particular pages and prevent overwriting of data. Such protection techniques may include software routines, hardware and logic routines, or a combination of software and hardware routines. Broadly speaking, as used in connection with this description, "protection" encompasses any process that will prevent particular pages from being overwritten until such protection is removed.

During execution of original binary code 104, the original binary code may request that operating system 108 (see FIG. 1) provide new memory address space. Alternatively, original binary code 104 itself may try to access memory address space that is occupied by the optimized binary code 106. When a request to use, e.g., write in, a protected area of memory address space 202 occurs (as indicated by the arrow labeled X in FIG. 2), an interrupt occurs and execution control is passed to dynamic optimizer 102 (as indicated by the dashed line labeled Y). Dynamic optimizer 102 copies the pages of optimized binary code 106 residing in the memory address space requested by original binary code 104, and writes the copied pages of the optimized binary code to unallocated memory address space. It should be understood that any number of pages can be identified for copying depending upon which memory address space is requested by the operating system or original binary code 104. By way of example, as indicated by the arrow labeled Z in FIG. 2, pages 3(B) and 4(B) of optimized binary code 106 have been copied and written to a new location in memory address space 202. After the copied pages have been written into the new memory address space, dynamic optimizer 102 adjusts optimized binary code 106 to ensure interoperability in light of the changed memory address space locations of the moved portions of the code. In one embodiment, dynamic optimizer 102 adjusts address data associated with pointers, branch instructions, jump instructions, etc. Dynamic optimizer 102 also releases the protection from modification, i.e., frees up, the copied pages of optimized binary code 106. As shown in FIG. 2, the symbol F indicates that the memory address space of the copied pages of the optimized binary code 106 has been released from protection. In one embodiment, dynamic optimizer 102 releases the copied pages of optimized binary code 106 by removing the read-only state.

Once dynamic optimizer 102 has released the copied pages from protection, execution control is returned to original code 104. Original code 104 then re-executes the request to use the memory address space occupied by the pages of optimized binary code 106 for which the protection has been released. As shown in FIG. 2, when original code 104 re-executes the request, pages 17(A) and 18(A) are written into the memory address space occupied by pages 3(B) and 4(B) of optimized binary code 106. By way of example, pages 17(A) and 18(A) may be the pages of data that the operating system or original binary code 104 requested to be written the memory address space originally occupied by optimized binary code 106. Of course, any number of pages can be written to the memory address space when the exemplary pages 17(A) and 18(A) are written.

Figure 3:
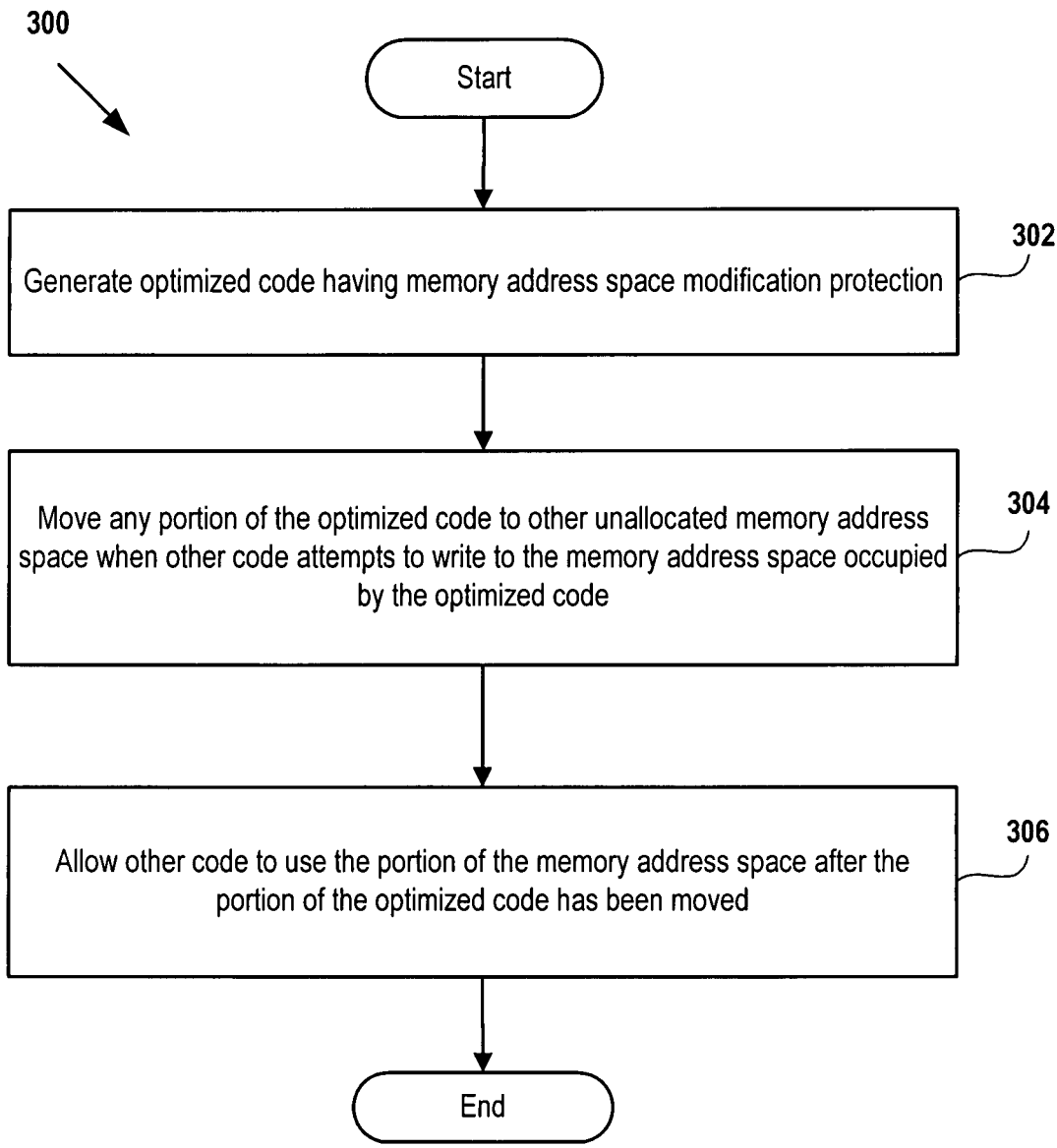
FIG. 3 is a flow chart diagram illustrating the method operations performed in the dynamic allocation of memory address space in accordance with one embodiment of the present invention.

FIG. 3 is a flow chart diagram 300 illustrating the method operations performed in the dynamic allocation of memory address space in accordance with one embodiment of the present invention. The method begins in operation 302 in which optimized code having memory address space modification protection is generated. The optimized code, i.e., the optimized version of an original program, may be generated by suitable optimization code, e.g., a dynamic optimizer, or other appropriate software. The memory address space modification protection may be implemented using software, hardware, or a combination of software and hardware. In addition, the memory address space modification protection may be provided whenever desired, e.g., when the optimized code is initially generated or when the optimized code is being executed, provided such protection is sufficient to prevent the optimized code from being overwritten. In operation 304, a portion of the optimized code is moved to an unallocated memory address space when other code attempts to write to the memory address location occupied by the portion of the optimized code. By way of example, the other code may be an operating system or another program, e.g., the original version of the program used to generate the optimized code. In one embodiment, the move operation is implemented by copying the portion of the optimized code residing in the memory address location being accessed by the other code and then writing this portion of the optimized code to an unallocated memory address space. Once the portion of the optimized code has been moved, the method proceeds to operation 306 in which the other code is allowed to use the portion of the memory address space occupied by the moved portion of the optimized code. In one embodiment, this operation is implemented by releasing the memory address space modification protection from the memory address space occupied by moved portion of the optimized code. Once the other code is allowed to use the memory address space, the method is done.

Figure 4:
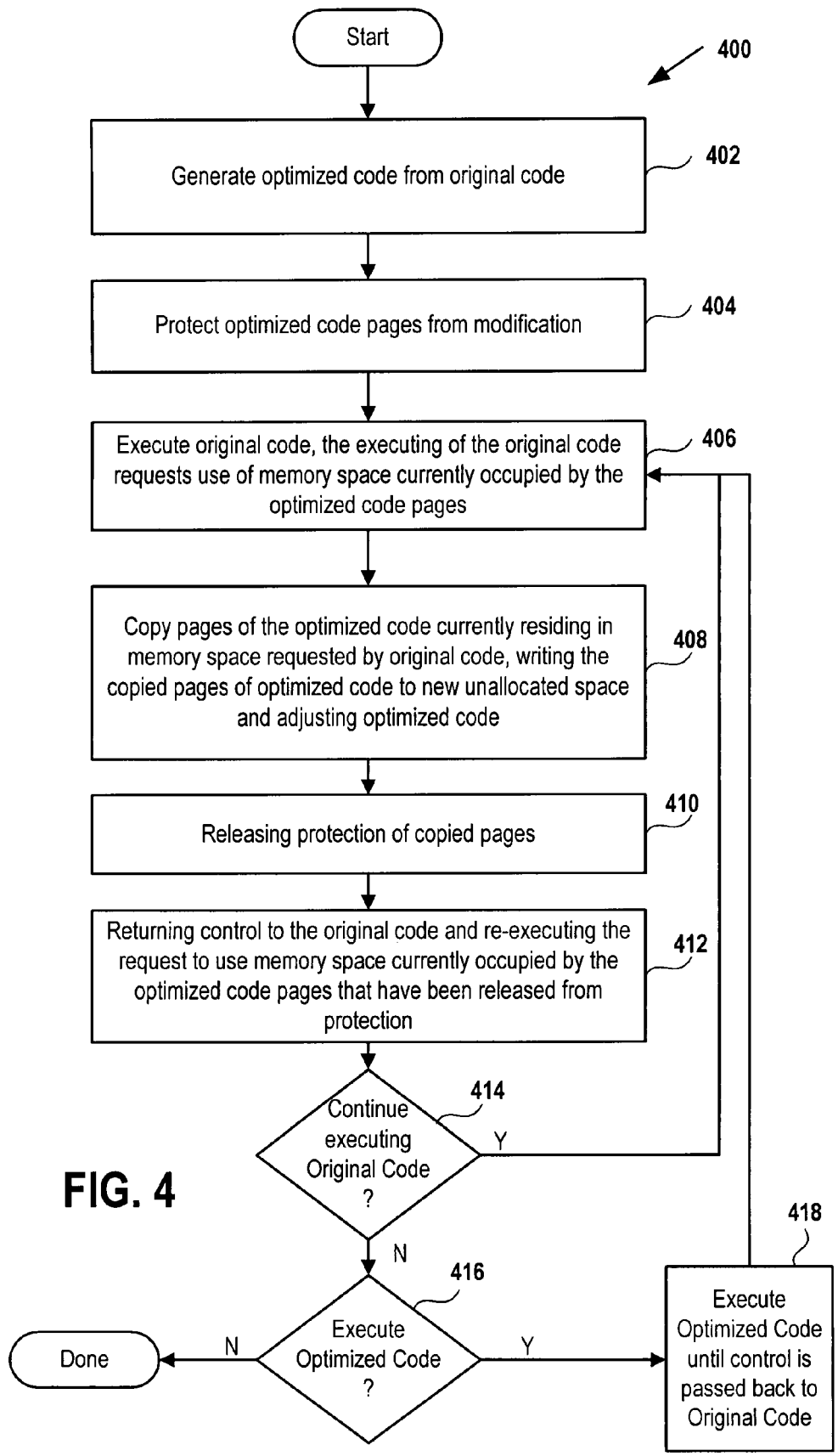
FIG. 4 is a flow chart diagram illustrating the method operations performed in the dynamic allocation of memory address space during the execution of an optimized version of a program in accordance with one embodiment of the present invention.

FIG. 4 is a flow chart diagram 400 illustrating the method operations performed in the dynamic allocation of memory address space during the execution of an optimized version of a program in accordance with one embodiment of the present invention. The method begins in operation 402 in which optimized code, i.e., an optimized version of a program, is generated from original code. As set forth above, the optimized code may be generated by suitable optimization code, e.g., a dynamic optimizer, or other appropriate software. In one embodiment, the optimized code is optimized binary code for a program that has been generated from the original binary code for the program. In operation 404, pages of the optimized code are protected from modification. The protection from modification should be configured to prevent the pages of the optimized code from being overwritten and may be implemented using software, hardware, or a combination of software and hardware. In one embodiment, the protection from modification is implemented by placing the pages of the optimized code in a read-only state. In operation 406, the original code, i.e., the original version of the program, is executed. During execution, the original code requests to use memory address space occupied by the pages of the optimized code. In operation 408, the pages of the optimized code residing in the memory address space requested by the original code are copied and then written to unallocated memory address space. The copying and writing may be carried out by suitable optimization code that detects the request to use memory address space occupied by the pages of the optimized code and intercepts this request. In one embodiment, the optimization code is a dynamic optimizer, e.g., dynamic optimizer 102 shown in FIGS. 1 and 2. In one embodiment, after the copying and writing has been completed, the memory address space to which the copied pages have been written is protected from modification. Once the pages of the optimized code have been copied and written to the unallocated memory address space, the optimization code adjusts the optimized code to ensure interoperability of the optimized code in light of the different memory address space locations of portions of the optimized code. In one embodiment, the optimization code adjusts the optimized code by adjusting address data associated with pointers, branch instructions, jump instructions, etc.

In operation 410, the protection from modification of the copied pages of the optimized code is released. In one embodiment, the protection is released after the writing of the copied pages to the unallocated memory address space. In one embodiment, the protection from modification of the copied pages of the optimized code is released by removing the read-only state. In operation 412, execution control is returned to the original code and the original code re-executes the request to use memory address space occupied by pages of the optimized code. As the protection for these pages of the optimized code has been released in operation 410, the original code will be allowed to use the requested memory address space upon re-execution of the request to use such memory address space. In decision operation 414, it is determined whether the execution of the original code is to be continued. If the execution of the original code is to be continued, then the method returns to operation 406. If not, then the method proceeds to decision operation 416. In decision operation 416, it is determined whether the optimized code is to be executed. If the optimized code is to be executed, then the method proceeds to operation 418. In operation 418, the optimized code is executed until control is passed back to the original code. When control is passed back to the original code during execution of the optimized code, the method returns to operation 406. When it is determined in decision operation 416 that the optimized code is not to be executed, the method is done.

Figure 5:
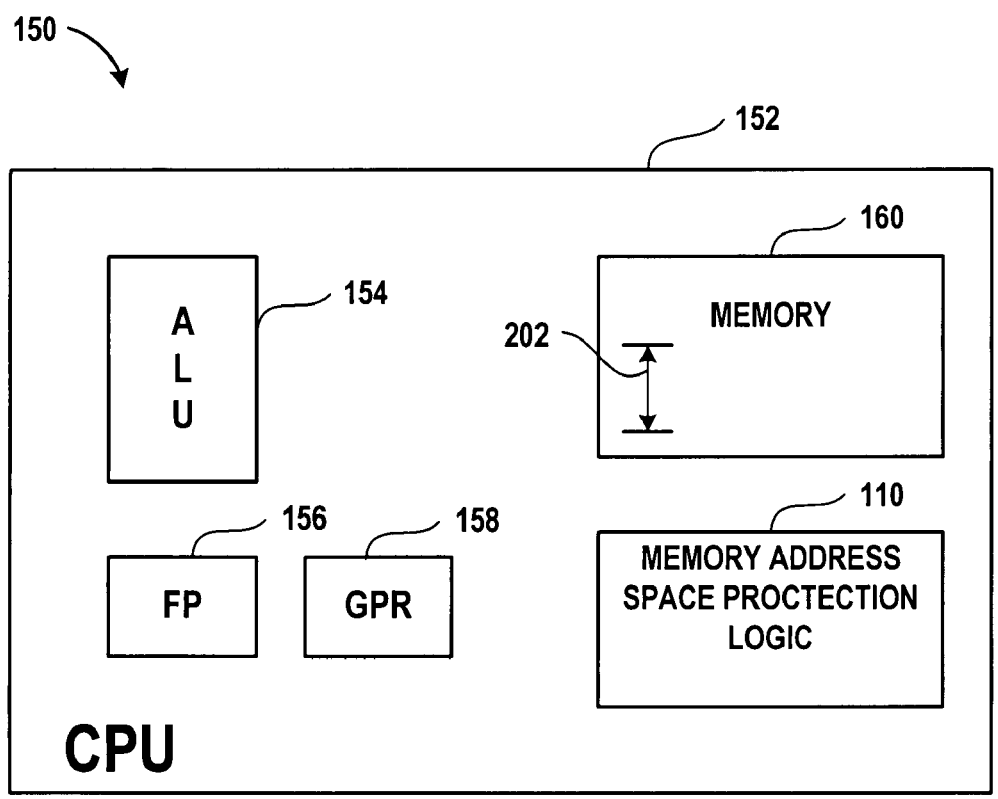
FIG. 5 is a simplified schematic diagram that shows a central processing unit (CPU) provided with memory address space protection logic that may be used to implement the methods described herein.

FIG. 5 is a simplified schematic diagram 150 that shows an exemplary central processing unit (CPU) provided with memory address space protection logic that may be used to implement the methods described herein. As shown in FIG. 5, central processing unit (CPU) 152 includes arithmetic logic unit (ALU) 154, floating point (FP) 156, general purpose registers (GPR) 158, memory 160, which includes memory address space 202, and memory address space protection logic 110. It is to be understood that any suitable CPU hardware configuration can be used and, therefore, the CPU may include more or less circuitry than shown in FIG. 5. As shown in FIG. 5, memory address space protection logic 110 is indicated generally by the single block designated by reference numeral 110; however, those skilled in the art will understand that the specific logic in an actual CPU may be spread across the CPU. By way of example, the memory address space protection logic 110 may include circuit elements, registers, or logic gates.

Those skilled in the art will recognize that the order in which the method operations are performed may be varied from that described herein, e.g., by rearranging the order in which the method operations are performed or by performing some of the method operations in parallel. Further, while the present invention has been described in the general context of an application program that is executed on an operating system in conjunction with a test system, it should be appreciated that the invention may be implemented with other routines, programs, components, data structures, etc., which perform particular tasks or implement particular abstract data types. In addition, the present invention may be practiced with other computer system configurations including hand-held devices, microprocessor systems, microprocessor-based or programmable consumer electronics, minicomputers, mainframe computers, and the like.

With the embodiments described herein in mind, it should be understood that the present invention may employ various computer-implemented operations involving data stored in computer systems. These operations are those requiring physical manipulation of physical quantities. These quantities usually, but not necessarily, take the form of electrical or magnetic signals capable of being stored, transferred, combined, compared, and otherwise manipulated. Further, the manipulations performed are often referred to using terms such as producing, identifying, determining, or comparing.

Any of the operations described herein that form part of the present invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The present invention also can be embodied as computer readable code on a computer readable medium. The computer readable medium may be any data storage device that can store data which can be thereafter be read by a computer system. Examples of the computer readable medium include hard drives, network attached storage (NAS), read-only memory, random access memory, CD-ROMs, CD-Rs, CD-RWs, magnetic tapes, and other optical and non-optical data storage devices. The computer readable medium also can be distributed over network coupled computer systems so that the computer readable code is stored and executed in a distributed fashion.

In summary, the present invention provides a method for the dynamic allocation of memory address space. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A method for dynamic allocation of memory address space, comprising:
    protecting an optimized version of a program from modification;
    executing an original version of the program, the executing of the original version of the program including executing a request to use memory address space occupied by the optimized version of the program;
    copying a portion of the optimized version of the program residing in the memory address space requested by the original version of the program, writing the copied portion of the optimized version of the program to unallocated memory address space, and adjusting code of the optimized version of the program;
    releasing the protecting of the copied portion of the optimized version of the program from modification after completing the writing;
    returning execution control to the original version of the program; and
    re-executing the request to use the memory address space occupied by the portion of the optimized version of the program for which the protecting has been released.

2. The method of claim 1, wherein the optimized version of the program is defined by pages of code.

3. The method of claim 1, wherein the portion of the optimized version of the program that is copied and written to unallocated memory address space is defined by one or more pages of code.

4. The method of claim 1, wherein the memory address space to which the copied portion of the optimized version of the program is written is protected from modification.

5. The method of claim 4, wherein the memory address space that is protected from modification is defined by one or more protected pages of code.

6. The method of claim 1, wherein the adjusting of the code of the optimized version of the program is configured to enable interoperability of the code of the optimized version of the program.

7. The method of claim 1, wherein the adjusting of the code of the optimized version of the program includes adjusting address data associated with at least one of pointers, branch instructions, and jump instructions.

8. The method of claim 1, wherein the protecting of the optimized version of the program places the optimized version of the program in a read-only state.

9. The method of claim 8, wherein the releasing of the protecting of the optimized version of the program removes the read-only state.

10. The method of claim 1, further comprising:
    detecting the request to use the memory address space occupied by the optimized version of the program during execution of the original version of the program; and
    passing execution control to an optimization code that was used to define the optimized version of the program, the optimization code being configured to execute the copying and the releasing.

11. The method of claim 1, wherein the protecting is carried out by a hardware device.

12. A method for dynamic allocation of memory address space, comprising:
    executing an original version of a program, the executing of the original version of the program including executing a request to use memory address space occupied by an optimized version of the program, the optimized version of the program being protected from modification;
    detecting the request to use the memory address space occupied by the optimized version of the program during execution of the original version of the program;
    passing execution control to an optimization code that was used to define the optimized version of the program, the optimization code executing
        copying of a portion of the optimized version of the program residing in the memory address space requested by the original version of the program, writing of the copied portion of the optimized version of the program to unallocated memory address space, and adjusting of code of the optimized version of the program; and
        releasing of the protecting of the copied portion of the optimized version of the program from modification after completing the writing;
    returning execution control to the original version of the program; and
    re-executing the request to use the memory address space occupied by the portion of the optimized version of the program for which the protecting has been released.

13. The method of claim 12, wherein the optimized version of the program is defined by pages of code.

14. The method of claim 12, wherein the portion of the optimized version of the program that is copied and written to unallocated memory address space is defined by one or more pages of code.

15. The method of claim 12, wherein the memory address space to which the copied portion of the optimized version of the program is written is protected from modification.

16. The method of claim 15, wherein the memory address space that is protected from modification is defined by one or more protected pages of code.

17. The method of claim 12, wherein the adjusting of the code of the optimized version of the program is configured to enable interoperability of the code of the optimized version of the program.

18. The method of claim 12, wherein the adjusting of the code of the optimized version of the program includes adjusting address data associated with at least one of pointers, branch instructions, and jump instructions.

19. The method of claim 12, wherein the protecting of the optimized version of the program places the optimized version of the program in a read-only state.

20. The method of claim 19, wherein the releasing of the protecting of the optimized version of the program removes the read-only state.

21. The method of claim 12, wherein the protecting is carried out by a hardware device.

22. Computer readable media containing program instructions for dynamic allocation of memory address space, the computer readable media comprising:
    program instructions for protecting an optimized version of a program from modification;
    program instructions for executing an original version of the program, the executing of the original version of the program including executing a request to use memory address space occupied by the optimized version of the program;

program instructions for copying a portion of the optimized version of the program residing in the memory address space requested by the original version of the program, writing the copied portion of the optimized version of the program to unallocated memory address space, and adjusting code of the optimized version of the program;

program instructions for releasing the protecting of the copied portion of the optimized version of the program from modification after completing the writing;

program instructions for returning execution control to the original version of the program; and program instructions for re-executing the request to use the memory address space occupied by the portion of the optimized version of the program for which the protecting has been released.

23. The computer readable media of claim 22, wherein the optimized version of the program is defined by pages of code.

24. The computer readable media of claim 22, wherein the portion of the optimized version of the program that is copied and written to unallocated memory address space is defined by one or more pages of code.

25. The computer readable media of claim 22, wherein the memory address space to which the copied portion of the optimized version of the program is written is protected from modification.

26. The computer readable media of claim 25, wherein the memory address space that is protected from modification is defined by one or more protected pages of code.

27. The computer readable media of claim 22, wherein the adjusting of the code of the optimized version of the program is configured to enable interoperability of the code of the optimized version of the program.

28. The computer readable media of claim 22, wherein the adjusting of the code of the optimized version of the program includes adjusting address data associated with at least one of pointers, branch instructions, and jump instructions.

29. The computer readable media of claim 22, wherein the protecting of the optimized version of the program places the optimized version of the program in a read-only state.

30. The computer readable media of claim 29, wherein the releasing of the protecting of the optimized version of the program removes the read-only state.

31. The computer readable media of claim 22, further comprising:

program instructions for detecting the request to use the memory address space occupied by the optimized version of the program during execution of the original version of the program; and program instructions for passing execution control to an optimization code that was used to define the optimized version of the program, the optimization code being configured to execute the copying and the releasing.

32. The computer readable media of claim 22, wherein the protecting is carried out by a hardware device.

33. A hardware component including logic for dynamic allocation of memory address space, comprising:

logic for executing an original version of a program, the executing of the original version of the program including executing a request to use memory address space occupied by an optimized version of the program, the optimized version of the program being protected from modification;

logic for detecting the request to use the memory address space occupied by the optimized version of the program during execution of the original version of the program;

logic for passing execution control to an optimization code that was used to define the optimized version of the program, the optimization code executing copying of a portion of the optimized version of the program residing in the memory address space requested by the original version of the program, writing of the copied portion of the optimized version of the program to unallocated memory address space, and adjusting of code of the optimized version of the program; and releasing of the protecting of the copied portion of the optimized version of the program from modification after completing the writing;

logic for returning execution control to the original version of the program; and logic for re-executing the request to use the memory address space occupied by the portion of the optimized version of the program for which the protecting has been released.

34. The hardware component of claim 33, wherein the optimized version of the program is defined by pages of code.

35. The hardware component of claim 33, wherein the portion of the optimized version of the program that is copied and written to unallocated memory address space is defined by one or more pages of code.

36. The hardware component of claim 33, wherein the memory address space to which the copied portion of the optimized version of the program is written is protected from modification.

37. The hardware component of claim 36, wherein the memory address space that is protected from modification is defined by one or more protected pages of code.

38. The hardware component of claim 33, wherein the adjusting of the code of the optimized version of the program is configured to enable interoperability of the code of the optimized version of the program.

39. The hardware component of claim 33, wherein the adjusting of the code of the optimized version of the program includes adjusting address data associated with at least one of pointers, branch instructions, and jump instructions.

40. The hardware component of claim 33, wherein the protecting of the optimized version of the program places the optimized version of the program in a read-only state.

41. The hardware component of claim 40, wherein the releasing of the protecting of the optimized version of the program removes the read-only state.

42. The hardware component of claim 33, wherein the hardware component is a processor.

* * * * *